United States Patent [19]

Pisoni

[11] 3,934,704

[45] Jan. 27, 1976

[54] DEVICE FOR A CONTROLLED, CENTRIFUGAL DISTRIBUTION OF PRODUCTS TO POST-FINISHING MACHINES

[76] Inventor: Ottorino Pisoni, Corso Sempione 51, Busto Arsizio (Varese), Italy

[22] Filed: June 13, 1973

[21] Appl. No.: 369,492

[30] Foreign Application Priority Data

June 13, 1972 Italy .................................. 25602/72

[52] U.S. Cl. ...................... 198/25; 198/27; 198/103

[51] Int. Cl.² ........................................... B65G 47/52

[58] Field of Search ......... 198/25, 27, 24, 102, 103, 198/20, 209

[56] References Cited

UNITED STATES PATENTS 3,207,286 9/1965 Cozzoli ................................ 198/25

3,517,793 6/1970 Böcker................................ 198/25

*Primary Examiner*—Evon C. Blunk

*Assistant Examiner*—James L. Rowland

*Attorney, Agent, or Firm*—Waters, Schwartz & Nissen

[57] ABSTRACT

A device by which soap cakes are centrifugally fed, at high speed to a machine wherein imprints are made thereon. The device comprises a trunnion type fixture, revolving about a vertical axis, and carrying radially extending guides, whereon the soap cakes, taken from a slow-running conveyor band, are placed and caused to advance at an ever increasing speed. From such guides the soap cakes are then transferred to a high speed running conveyor band, interlocked with the rotary motion of the trunnion type fixture.

8 Claims, 4 Drawing Figures

DEVICE FOR A CONTROLLED, CENTRIFUGAL DISTRIBUTION OF PRODUCTS TO POST-FINISHING MACHINES

This invention relates to a device by which products can be centrifugally delivered, under a suitable control, to post-finishing machines, and in particular for the delivery of soap cakes to an imprinting machine, e.g. of the type as disclosed in Italian Patent No. 997,666. The rotary automatic machine for continuously molding and imprinting soap cakes of any type and shape, as disclosed in said Patent, is fitted with a high-speed running conveyor, driven by the main shaft of the same machine (running at about 50–60 RPM). Said conveyor consists of a chain wherefrom suitably spaced dishlike pans are hung for receiving the soap cakes and carrying them to imprinting punches. To supply said loading conveyor with soap cakes it was therefore necessary to solve the problem of taking the soap cakes from a conveyor band running at a slow linear speed, and transferring them, accurately and uniformly spaced, onto the pans of the chain conveyor, running at a very high speed.

Such problem appears far from having been adequately solved by the heretofore known conventional devices, which are usually fitted with flat-nose pliers, or suckers or other similar means for takingup a single piece and transferring it from the slow running conveyor, to the high-speed running conveyor, as well as with complex mechanisms by which the required very high accelerations are imparted to the pieces.

The main object of this invention consists in the provision of a distributing device by which the required increase in the speed is progressively imparted to each piece, ensuring at the same time the accurate positioning thereof in the pans of the high speed chain conveyor.

The device for a controlled centrifugal distribution of products to post-finishing machines, and in particular of soap cakes to an imprinting machine, is characterized in that it comprises a horizontally revolving trunnion type fixture, having means located in a center portion thereof, by which pieces are taken out of a slow-running band conveyor and transferred into substantially radially extending guides, wherein said pieces, due to the action of centrifugal force, are radially moved at a progressively increasing speed, from the center of said trunnion type fixture, to the outer edge thereof, said fixture being revolvingly interlocked with a high speed running loading conveyor carrying dish like pans, whereinto each piece, delivered by the trunnion type fixture, is transferred and accurately positioned.

Further advantages and features of the distributing device according to the invention, will be better understood from a consideration of the following description of a preferred embodiment thereof, in conjunction with the accompanying drawings, being both given as a non restrictive example only. In the drawings.

Figure 1:
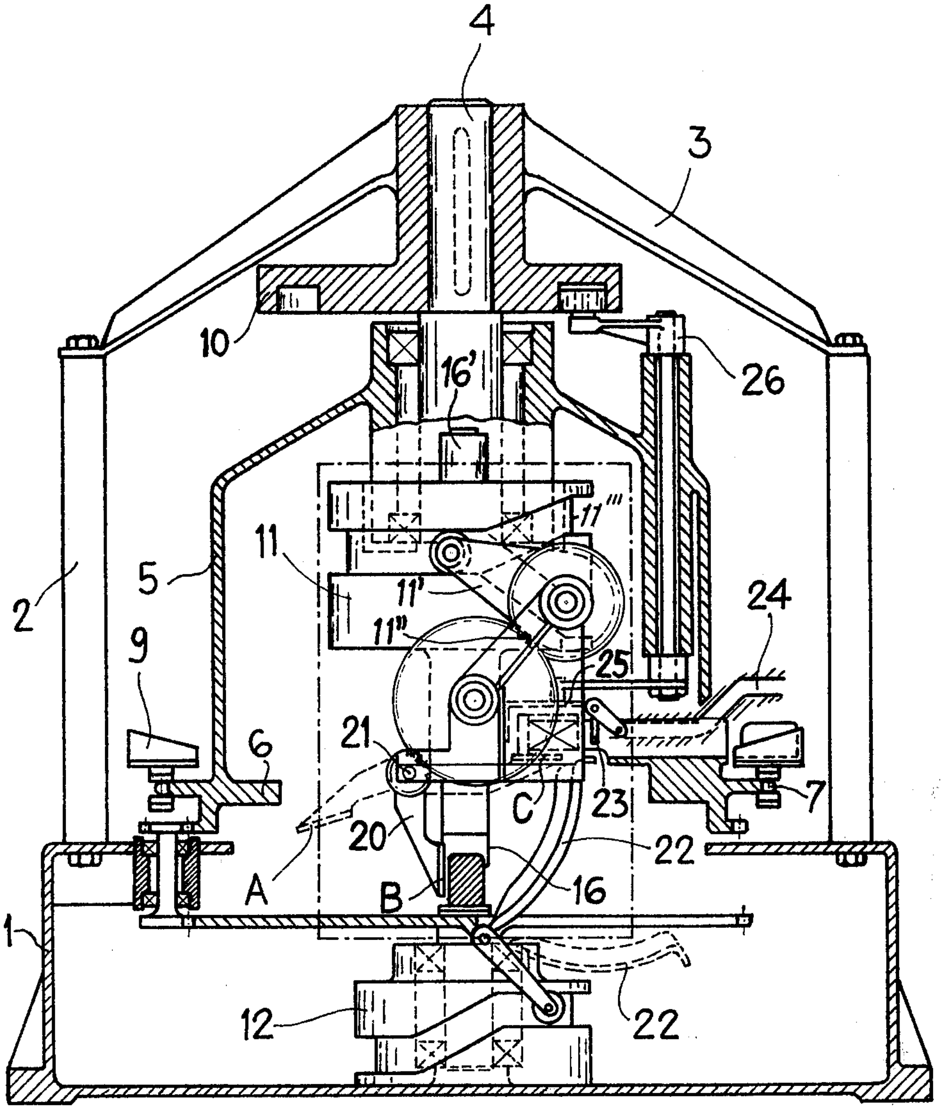
FIG. 1 is a part sectional front view of a centrifugal distributor, in its entirety.

Referring now to the drawings, the machine as shown therein comprises a bed 1, wherefrom uprights 2 extend for supporting a structure 3. Journalled on a shaft 4, vertically extending from said bed 1, is a trunnion type fixture 5, which comprises a lower platform 6, formed with a peripheral toothing 7 in mesh with a chain 8, by which dish-like pans 9 of a high speed running loading conveyor are supported. In the considered embodiment, the pitch diameter of toothing 7 corresponds to a circumferential length which is twice the center-to-center spacing of pans 9 supported by the chain 8, since the platform 6 is formed with two feeding channels. When a different number of feeding channels is provided in said platform, the pitch diameter of toothing 7 should be accordingly changed.

Fitted on shaft 4 are a first stationary cam 10, which is formed in the lower front side of structure 3, as well as a second cam 11 and a third cam 12.

Figure 2:
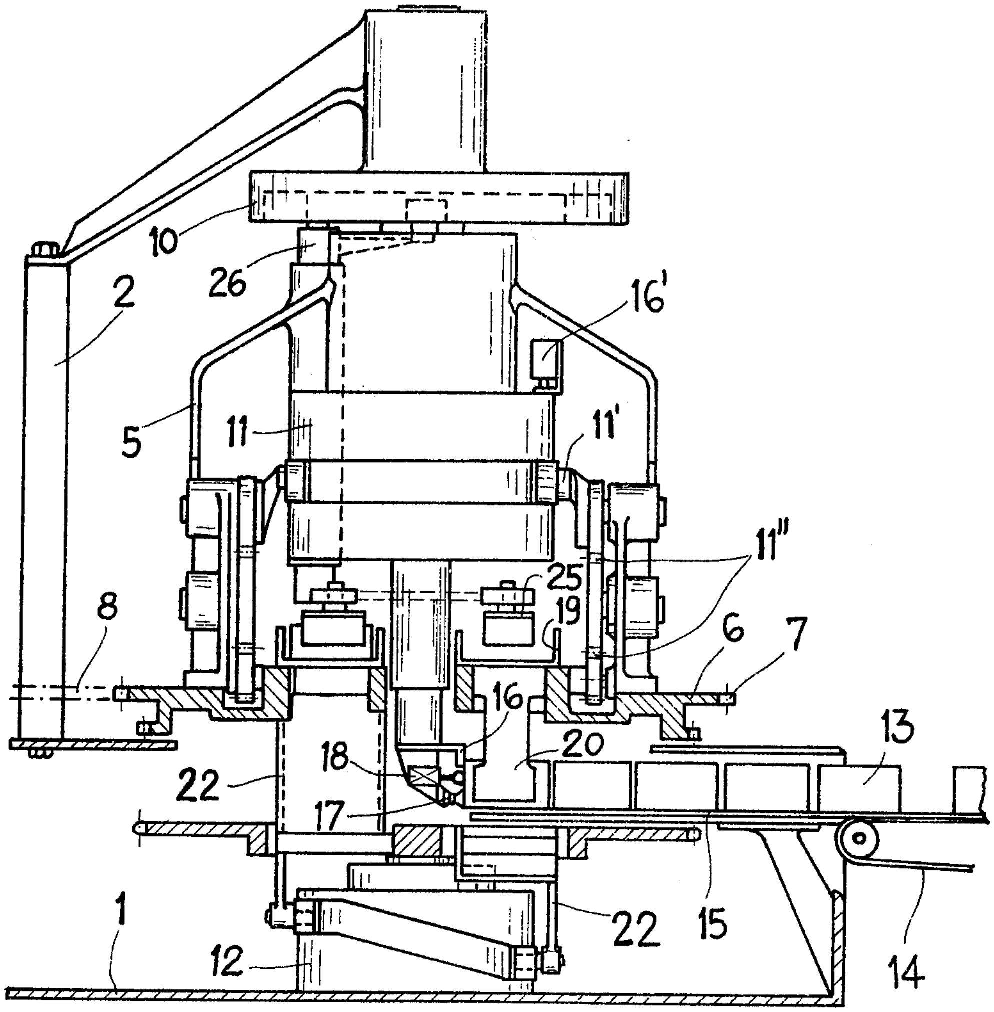
FIG. 2 is a part sectional side view of the distributor of FIG. 1.
Figure 3:
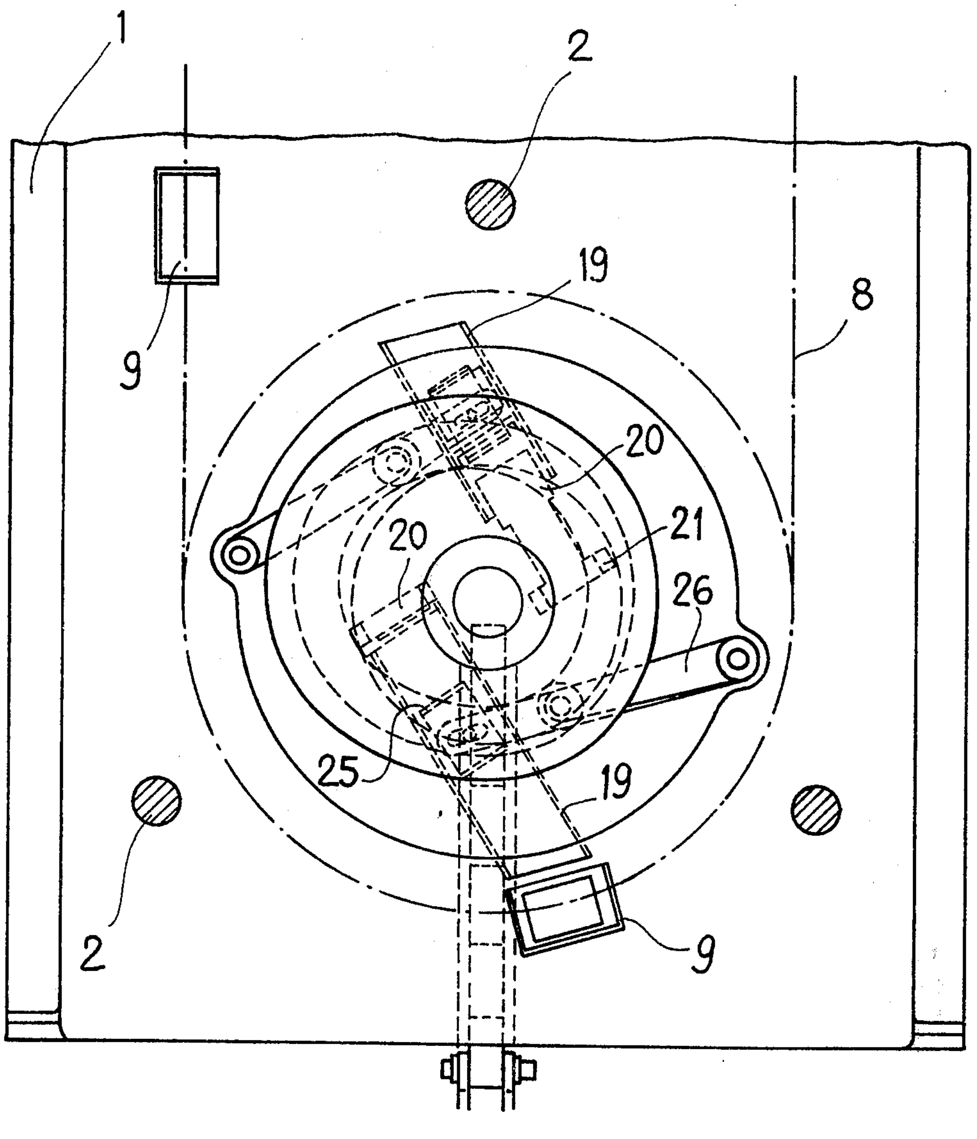
FIG. 3 is a diagrammatic plan view of the distributor of FIG. 1.

A device by which single soap cakes 13 are fed to the trunnion type fixture comprises (see FIG. 2) a slow-running conveyor band 14, whereon said soap cakes are conveyed inside bed 1 onto a plate 15 up to a catch 16, which is located directly adjacent to shaft 4. Fitted on said catch 16 is a small vacuum sucker 17, connected with a suction pump (not shown), to retain a soap cake 13 coming from band 14 and prevent bouncing back thereof. Also fitted on said shaft 4 is a pushbutton 18, by which the intervention of cam 11 is allowed only when the soap cake 13 is in contact with said pushbutton, i.e. in its correct takeout position, as it will be explained in more detail later on.

As previously stated, any bouncing back of soap cake from the catch 16, is positively prevented by the small sucker 17.

The platform 6 is formed with two channels 19, extending in an approximately radial direction from the center to the outer edge thereof, and is designed to serve as a guide for the single soap cakes 13 that are taken out of the underlying plate 15, and which are therein moved, under the action of centrifugal force developed by the trunnion like fixture 5, at a gradually increasing speed, toward the outlet of said channels 19.

Figure 4:
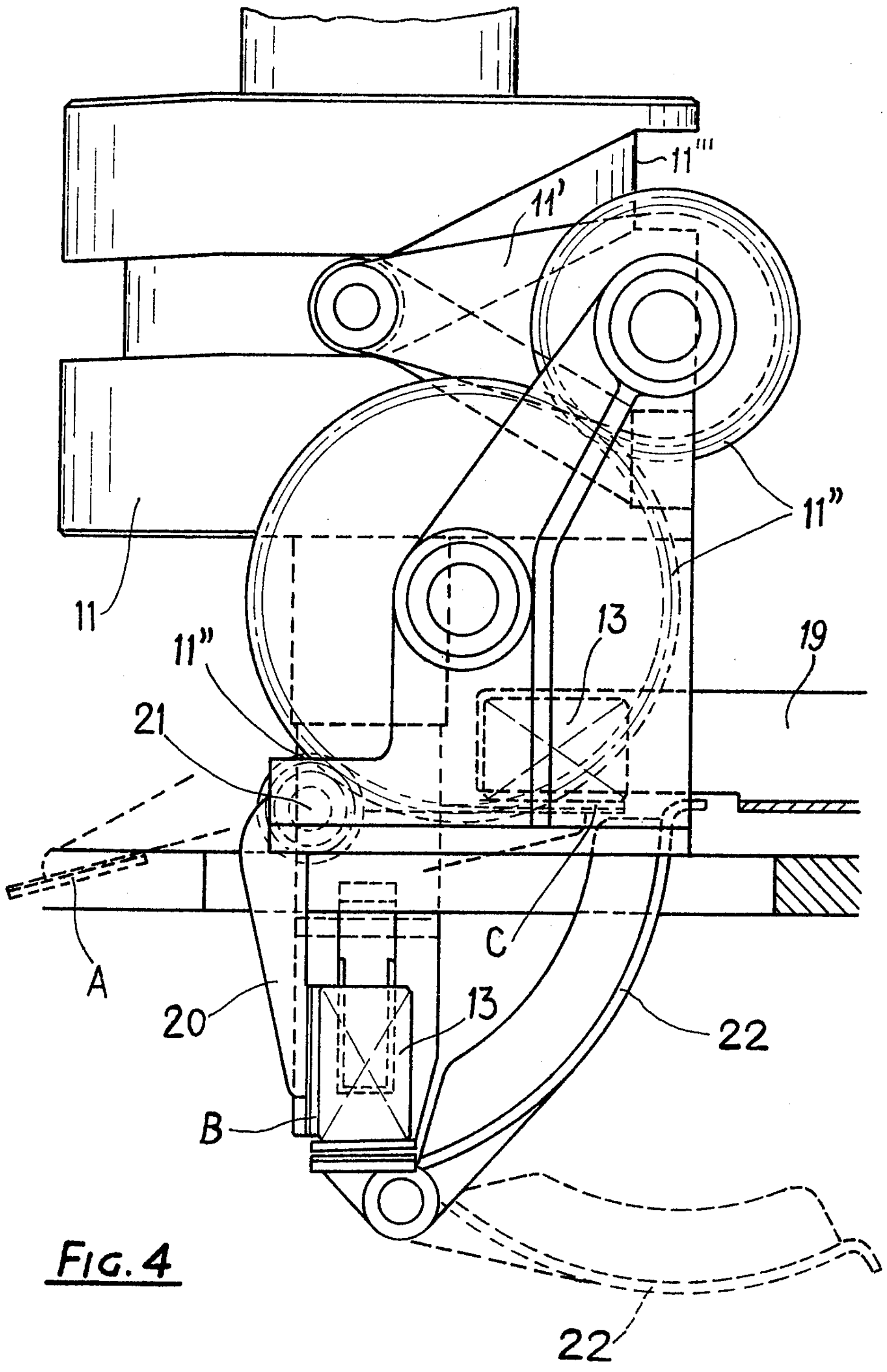
FIG. 4 is an enlarged view of a detail of device by which the pieces are taken out of band conveyor, as shown in chain-dotted outline in FIG. 1.

The mechanism by which each soap cake 13 is taken from plate 15 comprises (see FIG. 4) a blade 20 pivotally fitted on an axle 21, supported by the platform 6.

The blade 20 is operated by the cam 11 through a system of levers 11' and of toothed sectors 11'' (see FIG. 4), by which it is moved from its horizontal rest position A, firstly to its operative vertical position B, and finally to its horizontal loading position C. The soap cake 13, supported by the plate 15 against the catch 16, is overturned by the swinging motion of said blade 20, and transferred to the inlet of one of guide channels 19. A convex shaped chute 22, operated by the cam 12, is simultaneously moved (again as shown in the FIG. 4), from its position indicated in dotted lines, to its position indicated in solid lines. By said chute 22, the soap cake 13 is positively guided while it is being taken-up and transferred by the blade 20, thus preventing a possible lateral deviation thereof, due to centrifugal force.

The blade 20 is kept in its swung position, whereby to serve as a rest for the soap cake, located at the inlet of guide channel 19, until the soap cake is propelled into the channel 19 toward the outlet thereof by the centrifugal force as developed by the rotary motion of the trunnion like fixture 5. When the soap cake 13 is not in its correct taking-up position, then the pushbutton 18, with which the catch 16 is fitted, causes electromechanical device control 16' to shift the lever system 11' on a second track 11''' of cam 11, thus keeping the blade 20 in its inoperative position A. Therefore, the soap cake 13 is not transferred into the radial channel 19, and is handled by the next blade 20.

Controlling the opening of the outlets of channels 19 is a tilting catch 23, controlled by a fourth cam 24, and by which the soap cake 13 is allowed to pass only when one of the dish shaped pans 9 of the high-speed runing loading conveyor is correctly aligned with the outlet of one of the channels 19.

The trunnion type fixture 5 is moreover equipped with a device by which the motion of single soap cakes along the channels 19 and toward the outlets thereof, for the transfer onto the pans 9, can be controlled. Such device is utilized when, for the timing of an imprinting machine, the distributor is to be slowly operated by hand, whereby no centrifugal force sufficient for the forward motion of soap cakes is generated. Said device consists of a pusher 25, which is slidingly fitted in the channel 19, thereby driving the soap cake 13, said pusher 25 being controlled by the cam 10 through a lever system 26. Since two radially extending channels 19 are provided in the considered distributor, and with two blades 20, two pushers 25, along with the related controls are needed.

The operation of the centrifugal distributor is as follows:

Each soap cake 13 delivered by the band conveyor 14, is stopped against the catch 16, which is located as close as possible to shaft 4. Said soap cake is taken by the rotary or tilting blade 20, controlled by the cam 11, and transferred to the inlet of either of the channels 19. For performing said operation, the blade 20 is moved (see FIG. 4) from its horizontal rest position A, to vertical operating position B, wherein it comes into engagement with the soap cake 13, and then to horizontal loading position C. Simultaneously the convex shaped chute 22 is moved from the position as shown in dotted lines, to the position as shown in solid lines, thereby guiding the soap cake 13 while it is being transferred.

The soap cake 13, positioned at the inlet of channel 19, is supported by the blade 20, until is is moved, by the centrifugal force developed by the trunnion type fixture 5, at a gradually increaing speed, toward the outlet of channel 19.

If the soap cake 13 is not in its correct taking-up position on the plate 15, the pushbutton 18 fitted on catch 16 will not be depressed, to cause — through the electromechanical control 16' — the lever system 11' to be shifted to the second track 11''' of cam 11, thus keeping the blade 20 in its rest position A. Thus, in such a case, the blade 20 is not operated, and the next blade will be operated should the soap cake 13 be in its correct taking-up position. The dish-like pan 9, running across the outlet of channel 19 wherein no soap cake is fed, should in turn not be loaded, which results only in the inconvenience of having one soap cake not fed to the imprinting machine.

The soap cake 13 resting on the plate 15 in contact with the catch 16, is retained by the sucker 17, by which any displacement of soap cakes, coming from conveyor 14, is positively prevented. The soap cake 13 can be disengaged by the blade 20 from the sucker 17 since a sidewise motion in respect of the sucker mouth is imparted thereto.

The soap cake 13, after having been introduced into the radially extending channel 19, is driven by centrifugal force, toward the outlet thereof, wherein it is stopped by the tilting catch 23. Said catch 23, controlled by the cam 24, allows for the passage of soap cake 13, only when a dish shaped pan 9, supported by the high speed running loading conveyor, is correctly aligned with the outlet of channel 19.

While the imprinting machine is being timed, the centrifugal distributor is slowly operated by hand, and therefore a centrifugal force sufficient for driving the soap cakes across the radially extending channels 19 is not developed. Under such conditions, pusher 25, drives each soap cake 13 across its radial channel 19.

As it can be readily appreciated, the correct positioning of dish like pans 9 in front of the outlets of radial channels 19, to safely receive the soap cakes coming at a high speed therefrom, is ensured by the fact that the trunnion type fixture is directly driven by the high speed running conveyor, i.e. chain 8 is in mesh with the peripheral toothing 7 of platform 6 of said trunnion type fixture 5.

It is also manifest, from the previous disclosure, that many different operations are simultaneously performed by said channels, and namely: the centrifugal feeding of soap cakes to dish-like pans, a smooth and stepless acceleration of the cakes, starting from a zero speed, and the correct centering of cakes into the dish like pans, notwithstanding the very high speed of the conveyor by which they are carried, said pans, in the course of their parabolic travel about the trunnion type fixture, being always precisely followed by the soap cake feeding channels.

What I claim is:

1. A device for a controlled, centrifugal distribution of product pieces from a slow traveling band conveyor to pans on a high speed conveyer for delivery to a post-finishing machine, said device comprising a horizontally revolving trunnion type fixture, transfer means centrally located in said fixture for removing product pieces from the slow traveling band conveyor, radially extending guides positioned on said trunnion type fixture to receive said pieces from said transfer means and to transport the pieces under the action of centrifugal force in outward radial direction, at a progressively increasing speed, from the center to the periphery of said trunnion type fixture, and means on said fixture for revolvingly interlocking the same with the high speed conveyor carrying the pans, such that each product, delivered by the trunnion type fixture, is transferred to and accurately positoned in a respective pan.

2. A device according to claim 1, wherein said trunnion type fixture is driven directly by the high-speed conveyor via the interlocking means.

3. A device according to claim 2 comprising a fixed bed, a shaft vertically extending from said bed, said trunnion type fixture being journalled on said shaft and the interlocking means on the fixture including a lower horizontal platform comprising a peripheral toothing on said platform, said guides being respectively constituted by a channel which extends radially from the center to the peripheral edge of said platform.

4. A device according to claim 3, wherein said peripheral toothing is in mesh with said high speed conveyor, said toothing having a pitch diameter which provides a circumferential length equal to $n$ times the center-to-center spacing of dish-like pans carried by the high speed conveyor, where $n$ is the number of radial channels on said platform.

5. A device according to claim 4, wherein said transfer means includes means for displacing single product pieces from the slow conveyor onto said bed and catch means for stopping each product piece.

6. A device according to claim 5, wherein said catch means includes a vacuum sucker for retaining each product piece coming from the slow conveyor to prevent bouncing back thereof.

7. A device according to claim 6 wherein said transfer means further comprises a blade pivotally fitted on said trunnion type fixture, a first stationary cam controlling said blade to tilt the same and transfer a product piece to an inlet of one of said radial channels, a pivotal convex shaped chute, and a second stationary cam controlling said chute for pivotal movement with said blade to guide said piece.

8. A device according to claim 7 comprising a further cam and a pusher slidingly fitted in each of said radial channels and controlled by said further cam to move the piece through the channel when the device is being timed with the post-finishing machine.

* * * * *